Dec. 31, 1957   M. E. FAIN ET AL   2,818,199
DRY CHEMICAL FEEDER
Filed July 12, 1956   3 Sheets-Sheet 3

*INVENTORS*
MORTON EDGAR FAIN
ROBERT W. ALARIE
BY Kenway Jenney
Witter & Hildreth
ATTORNEYS

United States Patent Office 2,818,199
Patented Dec. 31, 1957

2,818,199

DRY CHEMICAL FEEDER

Morton Edgar Fain, Providence, and Robert W. Alarie, Johnston, R. I., assignors to Tower Iron Works Inc., Providence, R. I., a corporation of Rhode Island Application July 12, 1956, Serial No. 597,498

6 Claims. (Cl. 222—189)

In various systems of the type embodying the addition of a dry chemical in powder or granular form to a liquid flowing from one part of the system to another it is the usual practice to provide a metering device for adding the desired quantity over a specified period of time. Where the rate of feed of the dry chemical is relatively high the numerous commercially available devices are generally satisfactory, but where the rate of feed is small and variable, ranging from a fraction of an ounce to many pounds per hour, as for example in water treating and filtering systems, considerable difficulty is encountered when such metering devices are employed.

The principal objects of the present invention are to provide a dry chemical feeder or metering device which is adjustable so as to vary the rate of feed within and beyond the specified range, and to provide a reliable and efficient device of relatively simple, but durable construction, capable of giving trouble-free operation over a long period of time.

Further objects relate to various features of construction and will be apparent from a consideration of the following description and the accompanying drawings, wherein.

Figure 1:
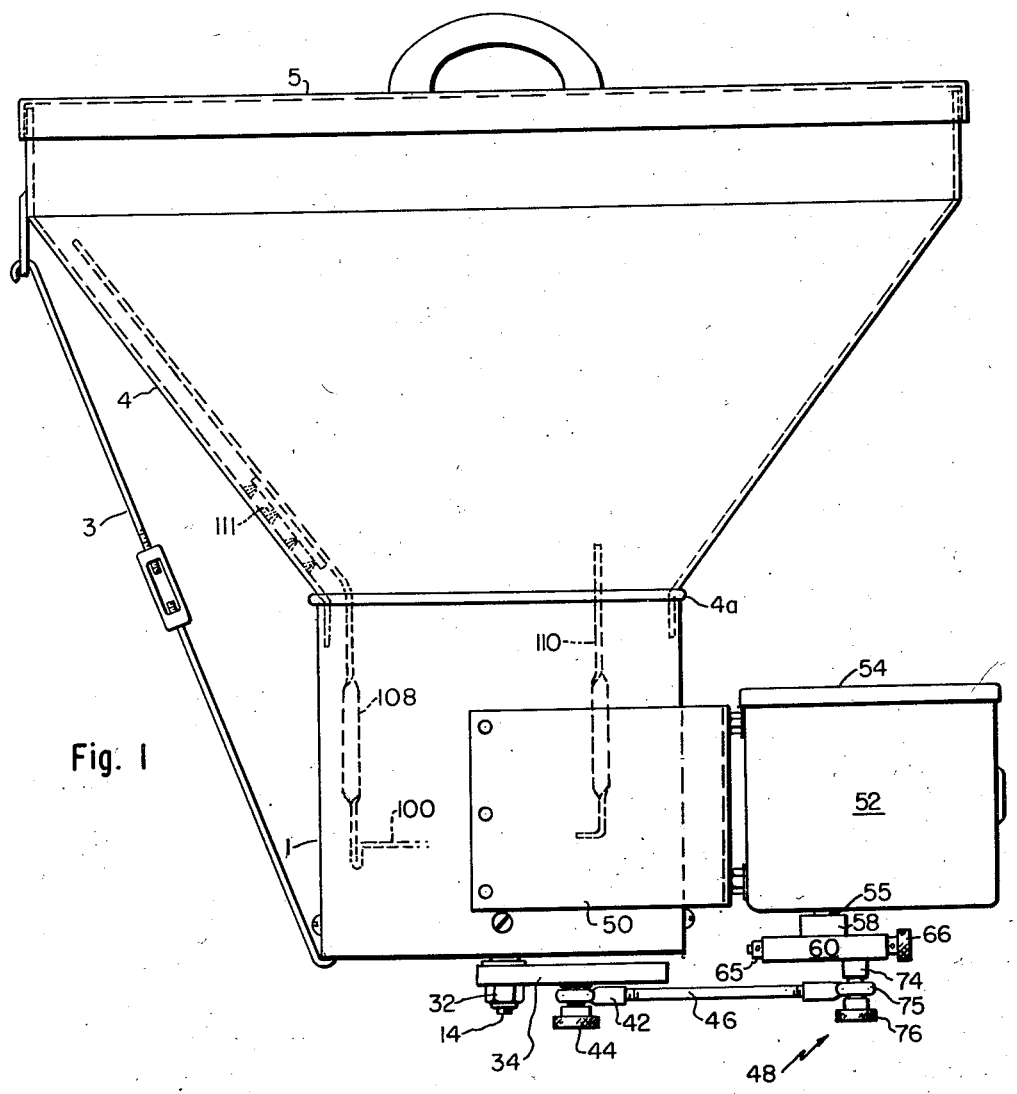
Fig. 1 is a side elevation of a metering device constructed in accordance with the present invention.

In accordance with the present invention we provide a metering device for feeding a dry chemical, either in powdered, granular or other finely divided form, which comprises a housing having at its lower part or end a discharge port above which is a pervious wall through which the chemical may pass. Such a pervious wall is preferably interchangeable with other such walls and may be a screen of metal or other inert material adequately supported, a perforated or slotted plate of suitable sheet material, or a fine grille-like plate, but in any case the openings are preferably sufficiently small to prevent the dry chemical from passing through unaided by a scraper, wiper blade or the like.

Projecting at right anagles through the central part of the pervious wall is a shaft which carries one or more wipers, each having a lower edge contiguous to or contacting the upper face of the pervious wall. Since the amount of dry chemical that will pass through the pervious wall will depend on the number of scraper blades, or wipers, their angular movement, and speed of oscillation, means are provided to vary such angular movement throughout a wide range, i. e., from virtually no angular movement to an angular movement which may exceed 90°, and also to vary the speed of oscillation. To this end an oscillating crank is connected with the lower part of the vertical shaft and this crank has an adjustable angular connection with one end of a connecting rod, the other end of which has a connection with an adjustable eccentric carried by the driving shaft of a variable speed motor or the power take-off of a speed reduction gear box driven by a variable speed motor. Thus, by varying the speed of the power take-off the degree of eccentricity, and/or the effective length or angularity of the crank arm, an unlimited number of adjustments may be made so that any rate of feed from less than 0.1 ounce to more than several pounds per hour may be achieved.

Since dry chemical in finely divided form tends to cake or block so as to prevent or interfere with a uniform gravity feed, we provide agitators for breaking up any caked accumulations in the housing above the pervious wall. To this end the upper part of the vertical shaft carries a unidirectional clutch having a driving member secured to the shaft and a driven member freely rotatable on the shaft above the driving member.

The driven member supports one or more arms which may extend outwardly and/or upwardly into the upper part of the housing and in order to prevent reverse movement, the outer end of one of these arms may carry means having a yielding contact with the inner wall of the housing so as to permit movement in one direction, but oppose reverse movement. Thus, the arms intermittently travel in one direction, while the wipers oscillate, and as the travel of these arms depends upon the oscillations transmitted to the vertical shaft, the operation of these arms is at all times synchronized with that of the wipers.

Referring to the drawings wherein we have shown what is now considered a preferred form of our improved device, the numeral 1 designates a cylindrical housing, the lower end of which is open to define a discharge port 2 and the upper end of the housing supports a frusto-conical hopper or reservoir 4 provided with a removable cover 5. The hopper 4 is firmly held in position by three circumferentially spaced tie rods 3, each carrying a turnbuckle, and the junction of the hopper and housing is provided with a sealing ring 4a. Mounted in the lower part of the housing is a spoke-like member or spider having a rim 6 and six radial legs 7 which support a pervious wall, here shown as a circular metal screen 8, the peripheral margin of which suitably carries an annular reinforcement 9 (Figs. 2 and 3) anchored to the rim of the spider.

The hub 10 of the spider is formed with a vertical opening in which are mounted spaced ball bearings 11 and 12 which rotatably support a vertical shaft 14 extending above and below the wall 8. Suitable seals 15 and 16 are provided to protect the ball bearings against dry chemical which might otherwise work in. Mounted on the shouldered surface of the shaft 14 is a clamping washer 18 which holds the central area of the screen 8 against the hub 10, and keyed or otherwise secured to the shaft 14 is a ring 20 having six circumferentially spaced lugs 22 depending from its under surface. These lugs project into openings formed in the hub 24 of a wiper support having six radial arms 25.

The arms 25 are of angular cross section to insure rigidity, and their vertical wings each carries a scraper blade or wiper 26 which may be of rubber or the like flexible material secured in position by screws 28. The pressure of the wipers 26 on the screen 8 is sufficient merely to aid the dry chemical in passing through the screen into the discharge port 72 when the shaft 14 is oscillated.

The lower end of the shaft 14 extends downwardly below the discharge port 2 and carries a bushing 30 and locking nut 32 between which one end of an oscillating crank arm 34 is clamped, a set screw 35 and key being provided to prevent turning of the crank on the shaft 14. The crank 34 is formed with a T-shaped slot or channel 36 which receives a sliding block or lug 38 formed with a depending pin 40 which projects through a bearing member 42. The lower end of the pin 40 is threaded and carries a locking nut 44 which cooperates with a washer 45 holding the parts in position. The bearing member 42 is threaded to one end of a connecting rod 46, the opposite end of which is connected with an adjustable eccentric mechanism designated by the numeral 48 (Figs. 1 and 4) and hereinafter described.

Screwed to the outer face of the housing 1 is a generally L-shaped bracket 50 which supports a casing 52 (Fig. 1) having a cover 54. Within this casing is a variable speed motor (not shown) connected with a reduction gear or other device having a power take-off shaft 55 operated at a speed which may be varied from less than 50 to more than 100 R. P. M., it being understood that conventional controls are provided to adjust the speed to the desired value.

Fixed to the shaft 55 is the hub 58 of an eccentric carrier 60 formed with a T-shaped slot or channel 62. A lead screw 64 extends through the channel 62 and its ends are rotatably supported in openings in the opposite ends of the carrier 60. A washer like member 65 pinned to one end of the lead screw and a thumb nut 66 pinned to the opposite end of the screw hold it against axial movement.

A stepped block or lug 70 is carried by the lead screw 64 so that it may be slid from one end of the channel to the other in response to rotation of the thumb nut 66. The block 70 carries a depending pin 72 which projects through a sleeve 74 and a bearing member 75 threaded to the opposite end of the connecting rod 46, the free end of the pin being threaded to receive a locking nut 76 which cooperates with sleeve 74 in holding the parts in position.

It will be observed that with the construction and arrangement thus far described, the eccentricity of the pin 72 (Fig. 4) may be varied from zero, when the pin 72 and shaft 55 are coaxial, to a maximum when the block 70 is at either end of the carrier slot 62. For a given setting of the block 70, the angular oscillatory movement of the crank arm 34 may be varied from virtually zero, when the arm 34 and connecting rod 46 are approximately aligned, to a maximum when the arm 34 is at right angles to the connecting rod. Hence, for a given operating speed of the shaft 55, the angular oscillatory movements of the shaft 14 and hence the wipers 26 may be varied from virtually zero to approximately 90°, depending upon the angular position and effective length of the crank arm 34.

In order to insure the gravitational flow of the dry chemical powder from the upper part of the housing 1 and reservoir 4 to the screen 8, we provide agitators for preventing accumulations of caked material in these parts. This device comprises a unidirectional clutch mechanism having a driving member or disk 80 (Fig. 3) pinned, keyed or otherwise secured to the upper part of the shaft 14, which member carries a spring pressed pawl 82 pivotally supported on its upper surface.

Circumposed about the shaft 14 and supported by the driving disk 80 is a flanged sleeve 84 which carries a bushing 85. Rotatably mounted on the bushing 85 is a hub 86 or a driven member or disk 88 having a depending flange 90 circumposed in spaced relation about the driving disk 80. Screwed, pinned or otherwise secured to the under surface of the hub 86 is a ring gear 92 having teeth engageable by the pawl 82. The parts are held in position by a lock nut 94 carried by the upper end of the shaft 14 so as to act on a washer 95 in a recess 95 formed in the hub 86. Sealing rings 96 and 98 are provided to prevent the dry chemical from working into the vicinity of the moving parts.

Mounted on the upper surface of the driven disk 88 are radial arms 100 and 101, the inner ends of which are received in radially extending recesses 102 and 103 formed in bosses integral with the disk 88, the arms being secured by screws 104 and 105, the latter passing through a slot 106 in the arm 101 so as to permit radial adjustment. The arm 100 is provided with an extension 108 which projects vertically through the upper part of the housing 1 and then inclines outwardly to the upper part of the reservoir 4. Similarly the arm 101 carries a vertical extension 110 which projects upwardly into the lower part of reservoir 4. A brush 111 (Fig. 1) is carried by the extension 108 so that it sweeps around the lower part of the reservoir and prevents bridging of the material therein.

Figure 2:
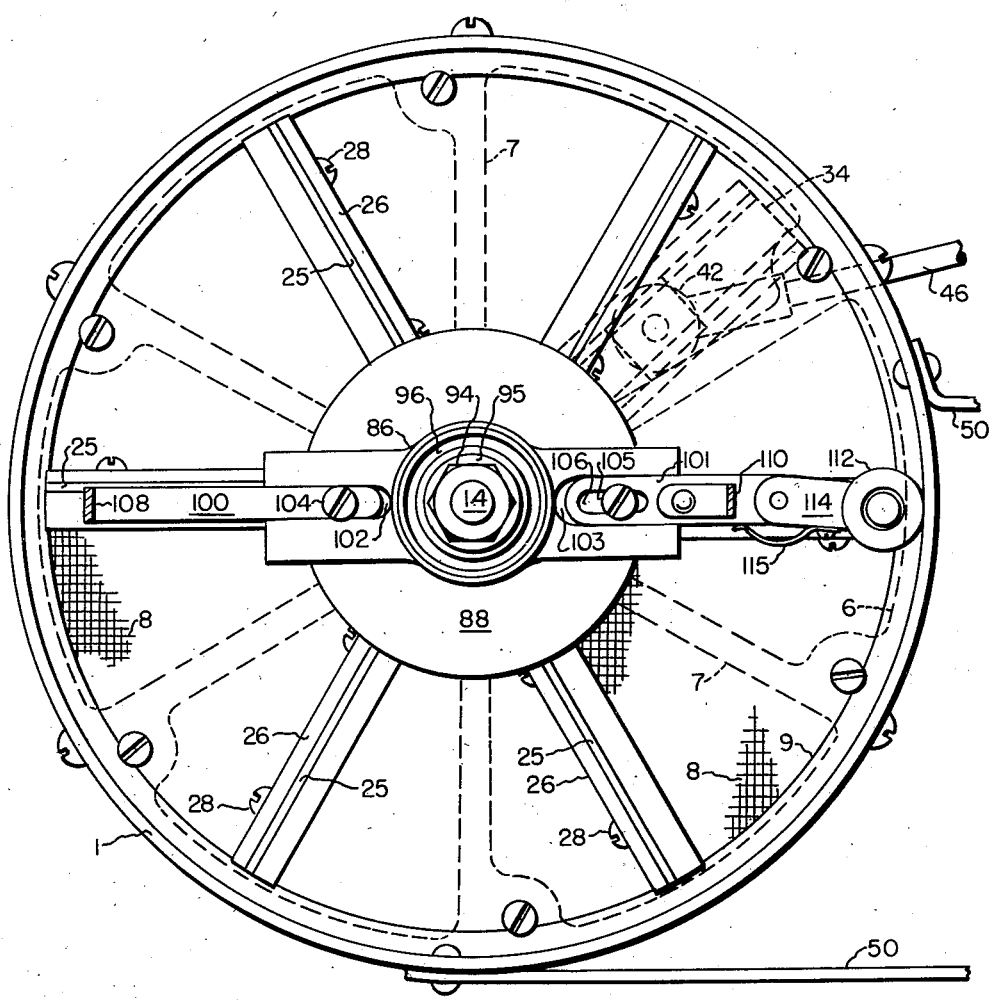
Fig. 2 is an enlarged top plan view of the device with the upper part or hopper removed.
Figures 3, 4:
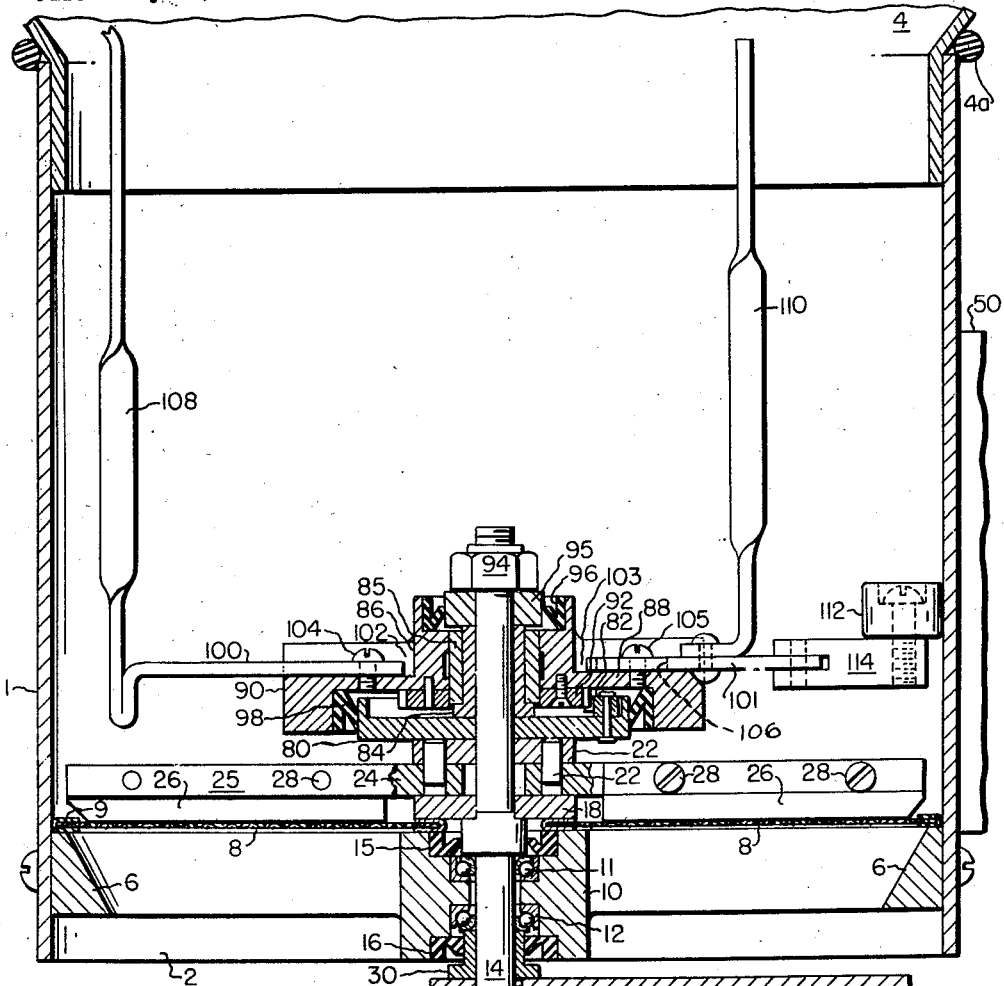
Fig. 3 is an enlarged vertical section through the device.
Fig. 4 is an enlarged section through the adjustable eccentric carried by the driving shaft of the motor.

With this construction and arrangement of parts oscillatory movement of the shaft 14 acts through the pawl 82 and ring gear 92 positively to drive the disk 88 and associated parts intermittently in one direction. Undesired reverse movement of the driven disk 88 and associated parts is prevented by the action of an over running brake device comprising a friction roller 112 rotatably supported on the ends of a finger 114 which is pivoted to the end of the arm 101 so as to swing toward and away from the inner cylindrical surface of the housing 1. A small leaf spring 115, carried by the finger 114 and acting on the arm 101, yieldingly urges the finger and roller to swing counter-clockwise (Fig. 2). So long as the arm 101 and finger 114 are angularly disposed, i. e., out of lengthwise alignment, the driven disk 88 and associated parts may be rotated counter-clockwise since the roller offers no impediment, but should a slight reverse movement of the parts take place, then the roller would tend to swing finger 114 into alignment with arm 101, thus creating a binding force which prevents further reverse movement.

It will be noted that the oscillatory movement of the shaft 14 controls both the magnitude of the oscillatory movement of the wipers and the intermittent movement of the agitator arms 108 and 110. Hence, the operation of these parts is synchronized and varies in accordance with the rate of feed. Apart from the adjustments heretofore explained, the amount of material to be fed or metered out will also depend on its state of subdivision and size of the openings in the screen or pervious wall. However, for any relatively homogeneous material of given particle size and a screen through which such material may pass with the aid of a wiper, the actual amount to be metered out for a given setting of the apparatus may be predetermined by trial and observation.

In operation the entire apparatus may be suspended above a pool or reservoir of liquid to be treated, or if desired the discharge port may be connected with a branch of a T through which is passing the liquid to be treated. A typical installation is in water treating systems wherein the metering device herein shown may be suspended above the water level surrounding the filter units and set to meter out a predetermined amount of filter aid or other material in a specified period of time.

While we have shown and described one desirable embodiment of the invention it is to be understood that this disclosure is for the purpose of illustration and various changes and modifications, other than those above suggested, may be made without departing from the spirit and scope of the invention as set forth in the appended claims.

We claim:

1. A metering device for feeding a dry chemical in finely divided form, comprising a housing having a discharge opening at its lower end and a pervious wall above said opening through which the dry chemical may pass, a shaft extending at right angles through the central area of said pervious wall, a wiper secured to said shaft above said wall with its lower edge in contiguous relation thereto, a clutch mechanism having a driving member secured to said shaft above said scraper and a driven member rotatably mounted on said shaft above said driving member, an oscillating crank arm secured to the lower part of said shaft means carried by said driven member opposing rotation in one direction, a motor having an eccentric carried by its driving shaft, and a connecting rod extending from said eccentric to said crank arm, the construction and arrangement of parts being such that the rotation of said eccentric effects a predetermined oscillatory movement of said crank arm and intermittent movement of said scraper.

2. A metering device as set forth in claim 1, wherein said means for opposing rotation of the driven member comprises a laterally projecting arm secured to the driven member and roller carried by the outer end of said laterally projecting arm so as yieldingly to contact the inner wall of said housing.

3. A metering device as set forth in claim 1, wherein said driven member carries an upwardly projecting agitator arm extending into the upper part of said housing for breaking up caked accumulations of the dry chemical within the housing.

4. A metering device as set forth in claim 2, wherein said laterally projecting arm supports an upwardly projecting agitator arm which extends into the upper part of said housing for breaking up caked accumulations of the dry chemical within said housing.

5. A metering device as set forth in claim 1, wherein said driven member supports a plurality of upwardly projecting agitator arms which extend into the upper part of said housing to break up caked accumulations of the dry chemical within the housing.

6. A metering device for feeding a dry chemical in finely divided form, comprising a housing having a discharge opening at its lower end and a pervious wall above said opening through which the dry chemical may pass, a shaft extending at right angles through the central area of said pervious wall, a scraper secured to said shaft above said wall with its lower edge in contiguous relation thereto, a slotted crank arm secured to the lower part of said shaft, a motor having a carrier plate secured to its driving shaft, said plate having a radially extending slot, an eccentric pin adjustably mounted in said slot, and a connecting rod connected at one end to said eccentric pin, the other end of said connecting rod being adjustably connected with said slotted crank arm so as to effect a predetermined oscillatory movement of said scraper for a given speed of rotation of said motor.

References Cited in the file of this patent

UNITED STATES PATENTS

| | | |
|---|---|---|
| 817,727 | Sletto | Apr. 10, 1906 |
| 1,730,784 | Rogginger | Oct. 8, 1929 |
| 1,845,429 | Lorenz et al. | Feb. 16, 1932 |
| 2,002,420 | Strosk | May 21, 1935 |
| 2,435,039 | Harper | Jan. 27, 1948 |
| 2,439,014 | Luhrmann | Apr. 6, 1948 |
| 2,520,546 | Hughes | Aug. 29, 1950 |